(12) United States Patent
Shimazaki et al.

(10) Patent No.: US 11,598,369 B2
(45) Date of Patent: Mar. 7, 2023

(54) BEARING DEVICE

(71) Applicant: RIGAKU CORPORATION, Akishima (JP)

(72) Inventors: Yasuyuki Shimazaki, Akishima (JP); Shinichi Oya, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 0 days.

(21) Appl. No.: 17/313,326

(22) Filed: May 6, 2021

(65) Prior Publication Data

US 2021/0372467 A1 Dec. 2, 2021

(30) Foreign Application Priority Data

May 27, 2020 (JP) .............................. JP2020-091906

(51) Int. Cl.
*F16C 19/54* (2006.01)
*F16C 37/00* (2006.01)
*F16C 33/76* (2006.01)
*F16C 25/08* (2006.01)

(52) U.S. Cl.
CPC ............ *F16C 19/548* (2013.01); *F16C 25/08* (2013.01); *F16C 33/765* (2013.01); *F16C 37/007* (2013.01)

(58) Field of Classification Search
CPC ...... F16C 19/548; F16C 25/08; F16C 33/765; F16C 37/007; F16J 15/43
See application file for complete search history.

(56) References Cited

U.S. PATENT DOCUMENTS

| 6,158,895 | A | * | 12/2000 | Date | ................. F16C 19/525 384/493 |
| 2004/0013335 | A1 | * | 1/2004 | Inoue | ................. H02K 5/1732 409/231 |
| 2017/0248168 | A1 | * | 8/2017 | Yamashita | .............. F16C 37/00 |

FOREIGN PATENT DOCUMENTS

| CN | 106062394 A | * | 10/2016 | ........... B23Q 11/127 |
| JP | 2006125485 A | * | 5/2006 | ........... F16C 33/6659 |
| JP | 2019-173911 A | | 10/2019 | |

OTHER PUBLICATIONS

Machine Translation of JP-2006125485-A (Year: 2006).*

* cited by examiner

*Primary Examiner* — Alan B Waits
(74) *Attorney, Agent, or Firm* — WHDA, LLP (57) ABSTRACT

Only an outer spacer (33) is cooled by an outer spacer cooling structure, thereby causing a temperature difference between an inner spacer (32) and the outer spacer (33). According to this temperature difference, an inner ring (37) of a bearing (31) is displaced relatively to an outer ring (38) in a direction in which a preload inside the bearing (31) decreases.

7 Claims, 9 Drawing Sheets

BEARING DEVICE

FIELD OF THE INVENTION

The present invention relates to a bearing device for supporting a rotating shaft such that the rotating shaft is freely rotatable, and particularly relates to a bearing device suitable for supporting a rotating shaft which has a large diameter and rotates at a high speed.

BACKGROUND OF THE INVENTION

In a bearing device for supporting a rotating shaft by using a bearing, a preload inside the bearing is adjusted with high accuracy so that the bearing device continues to support the rotating shaft while causing the rotating shaft to rotate smoothly.

However, the bearing and the rotating shaft are caused to expand in a radial direction and thus the preload inside the bearing increases due to frictional heat inside the bearing caused by rotation of the rotating shaft and temperature rise of the rotating shaft caused by an external factor or the like. As a result, there is a risk that the bearing locks and thus the rotating shaft cannot rotate smoothly.

Therefore, many cooling measures for bearing devices have been proposed in the past.

For example, a cooling structure of a bearing device disclosed in Japanese Patent Laid-Open No. 2019-173911 (hereinafter referred to as Patent Document) is configured so that an air supply port (23) is provided on the inner peripheral surface of an outer ring spacer (15) of rolling bearing (3, 4), and compressed air (A) for cooling is blown from the air supply port (23) to the outer peripheral surface of an inner ring spacer (16) to cool each of the outer ring spacer (15) and the inner ring spacer (16). The compressed air (A) is exhausted from spacer spaces (21A, 21B) through an exhaust path (30) formed inside a housing (2).

Note that reference numerals in the above parentheses are reference numerals assigned in the figures of the Patent Document.

In the bearing device having the conventional cooling structure, it is possible to avoid the bearing from locking while the cooling structure has been capable of suppressing the temperature rise in the inner ring of the bearing and the rotating shaft.

However, if the cooling structure becomes uncapable of suppressing the temperature rise in the inner ring of the bearing and the rotating shaft, the bearing would lock. For example, in the case of a rotating shaft having a large diameter and rotating at a high speed, the peripheral speed on the outer peripheral surface during high-speed rotation is extremely high, so that the amount of heat generated in the bearing which is rotationally supporting the rotating shaft is large. In addition, the rotating shaft having the large diameter expands greatly when the temperature rises. Therefore, even in the case of the bearing device having the conventional cooling structure, it is impossible to suppress the preload change inside the bearing, so that the bearing may lock. Therefore, an effective countermeasure has been desired. It should be noted that an effective measure is likewise required regardless of whether the rotating shaft has a large diameter because the bearing may lock when it becomes impossible to suppress the preload change inside the bearing.

SUMMARY OF THE INVENTION

The present invention has been made in view of the above circumstances, and has an object to provide a bearing device that can suppress a preload change inside a bearing caused by a temperature rise of the bearing or a rotating shaft.

In order to attain the above object, according to the present invention, a bearing device for supporting a rotating shaft by a plurality of bearings such that the rotating shaft is freely rotatable, comprises: an inner spacer arranged between respective adjacent bearings of the plurality of bearings so as to be in contact with an inner ring of each of the respective adjacent bearings; an outer spacer arranged between respective adjacent bearings of the plurality of bearings so as to be in contact with an outer ring of each of the respective adjacent bearings; and an outer spacer cooling structure for cooling the outer spacer.

In the present invention having the above-described configuration, the outer spacer is cooled by the outer spacer cooling structure to generate a temperature difference between the inner spacer and the outer spacer, whereby the inner ring of the bearing can be displaced relatively to the outer ring in a direction in which a preload inside the bearing decreases. Therefore, it is possible to suppress the preload inside the bearing from increasing due to temperature rise of the bearings and the rotating shaft.

Specifically, it is preferable that the inner spacer is formed in a cylindrical shape along the inner ring of the bearing, the outer spacer is formed in a cylindrical shape along the outer ring of the bearing, and the inner spacer is configured so as to press the inner ring of the bearing in an axial direction according to a temperature difference generated between the inner spacer and the outer spacer, thereby displacing the inner ring of the bearing in the axial direction relatively to the outer ring of the bearing.

As a result, the inner ring of the bearing can be displaced relatively to the outer ring in the direction in which the preload inside the bearing decreases, and it is possible to suppress the preload inside the bearing from increasing due to the temperature rise of the bearings and the rotating shaft.

Here, it is preferable that the plurality of bearings is assembled in a back-to-back duplex bearing arrangement in which back surfaces thereof are arranged to face each other. In the case where the bearings are assembled in the back-to-back duplex bearing arrangement, the preload of the bearing is released when the inner ring is pressed from the back side. According to the present invention, the outer spacer is cooled by the outer spacer cooling structure to generate a temperature difference between the inner spacer and the outer spacer, whereby the inner spacer presses the inner ring of the bearing from the back side in the axial direction to release the preload of the bearing. In this way, the inner ring of the bearing can be displaced relatively to the outer ring in the direction in which the preload inside the bearing decreases, and it is possible to suppress the preload inside the bearing from increasing due to the temperature rise of the bearings and the rotating shaft.

The bearing device according to the present invention may be configured to further comprise a device main body which accommodates the plurality of bearings, the inner spacer and the outer spacer therein, wherein a refrigerant flow path for cooling the plurality of bearings is formed in the device main body, refrigerant flow paths constituting the outer spacer cooling structure are formed in the device main body, and the refrigerant flow paths are configured to communicate with each other and circulate refrigerant.

Further, the bearing device according to the present invention may be configured to further comprise a device main body which accommodates the plurality of bearings, the inner spacer and the outer spacer therein and in which a magnetic fluid seal portion is incorporated, wherein a refrigerant flow path for cooling the magnetic fluid seal portion is formed in the device main body, refrigerant flow paths constituting the outer spacer cooling structure are formed in the device main body, and the refrigerant flow paths are configured to communicate with each other and circulate refrigerant.

Still further, the bearing device according to the present invention may be configured to further comprise a device main body which accommodates the plurality of bearings, the inner spacer and the outer spacer therein and in which a heat exhausting portion for cooling the rotating shaft is incorporated, wherein a refrigerant flow path for cooling the heat exhausting portion is formed in the device main body, refrigerant flow paths constituting the outer spacer cooling structure are formed in the device main body, and the refrigerant flow paths are configured to communicate with each other and circulate refrigerant.

Still further, the bearing device according to the present invention may be configured to further comprise a device main body which accommodates the plurality of bearings, the inner spacer, and the outer spacer therein and in which a magnetic fluid seal portion and a heat exhausting portion for cooling the rotating shaft are incorporated, wherein a refrigerant flow path for cooling the plurality of bearings, a refrigerant flow path for cooling the magnetic fluid seal portion, a refrigerant flow path for cooling the heat exhausting portion, and refrigerant flow paths constituting the outer spacer cooling structure are formed in the device main body, and the refrigerant flow paths are configured to communicate with one another and circulate refrigerant.

As described above, the respective refrigerant flow paths are made to communicate with one another, whereby it is possible to cause a common refrigerant to flow through these refrigerant flow paths and realize efficient cooling.

As described above, according to the present invention, it is possible to suppress the preload change inside the bearings due to the temperature rise of the bearings or the rotating shaft.

DETAILED DESCRIPTION OF THE EMBODIMENT

An embodiment of the present invention will be hereunder described in detail with reference to the drawings.

Figure 1:
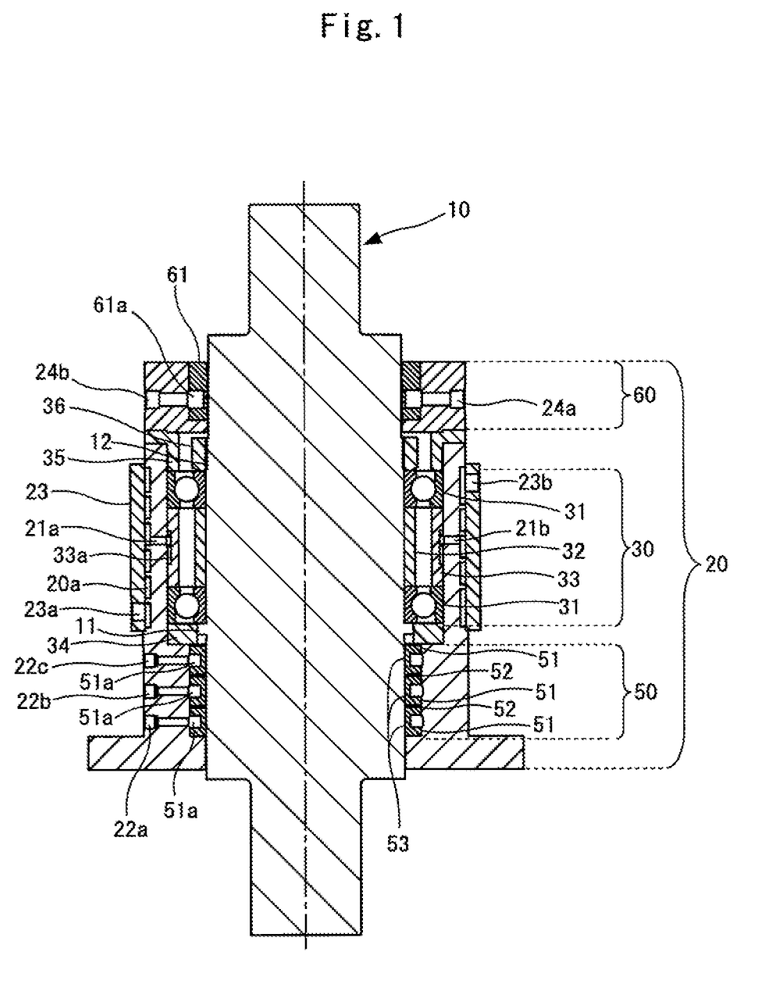
FIG. 1 is a cross-sectional view showing an internal structure of a bearing device according to an embodiment of the present invention when the bearing device is viewed from a front side thereof.
Figure 2:
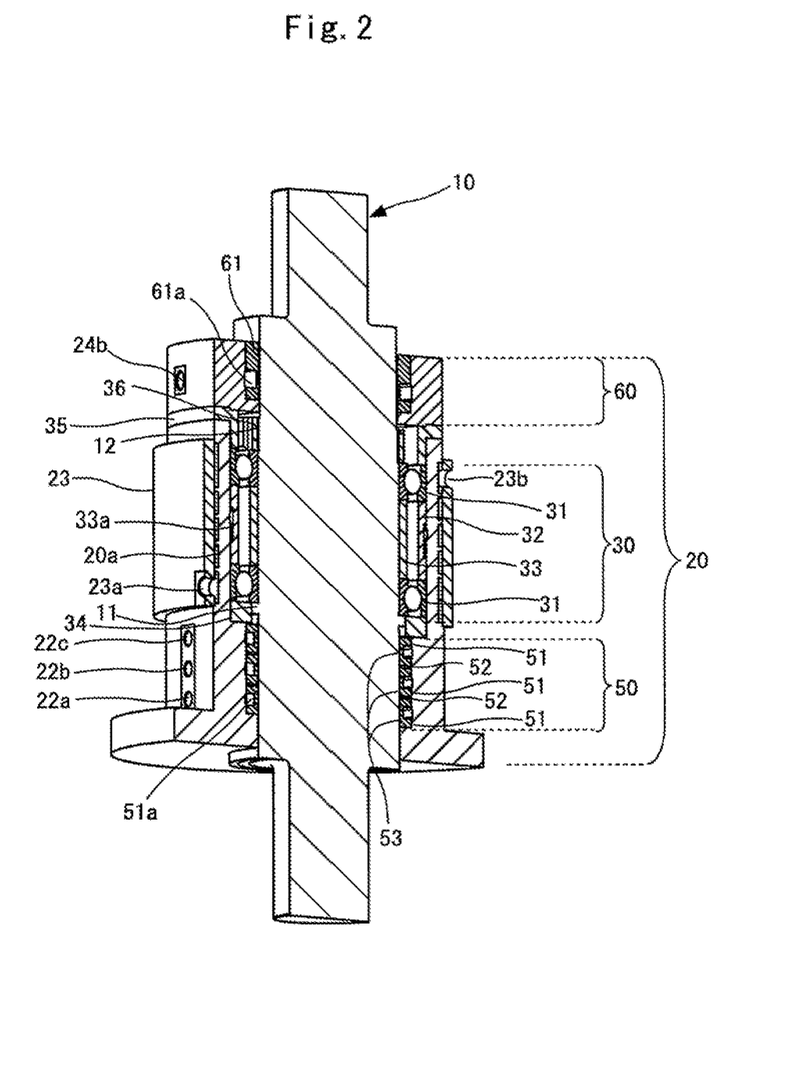
FIG. 2 is a partially cutaway perspective view showing the internal structure of the bearing device according to the embodiment of the present invention.
Figure 3:
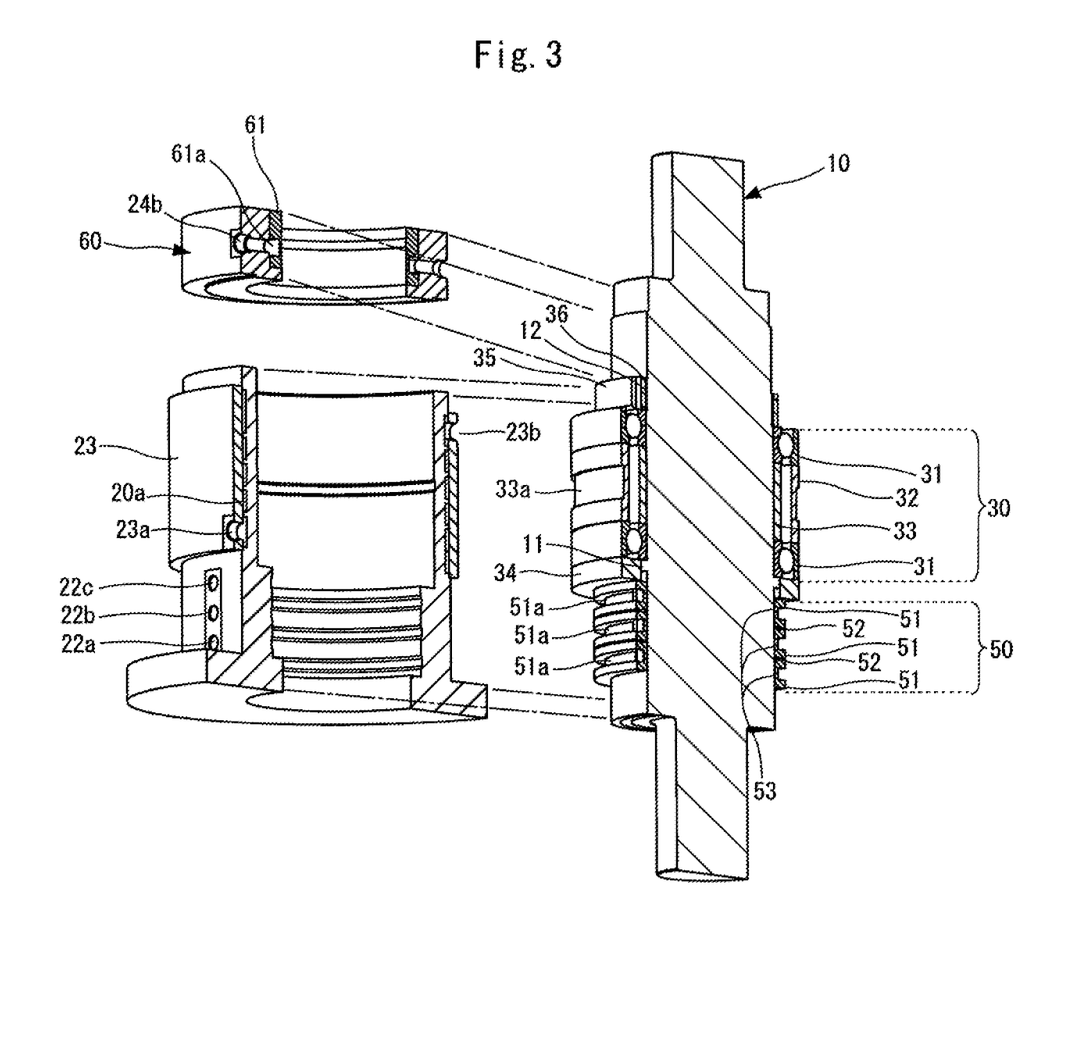
FIG. 3 is a partially cutaway exploded perspective view showing the internal structure of the bearing device according to the embodiment of the present invention.
Figure 4:
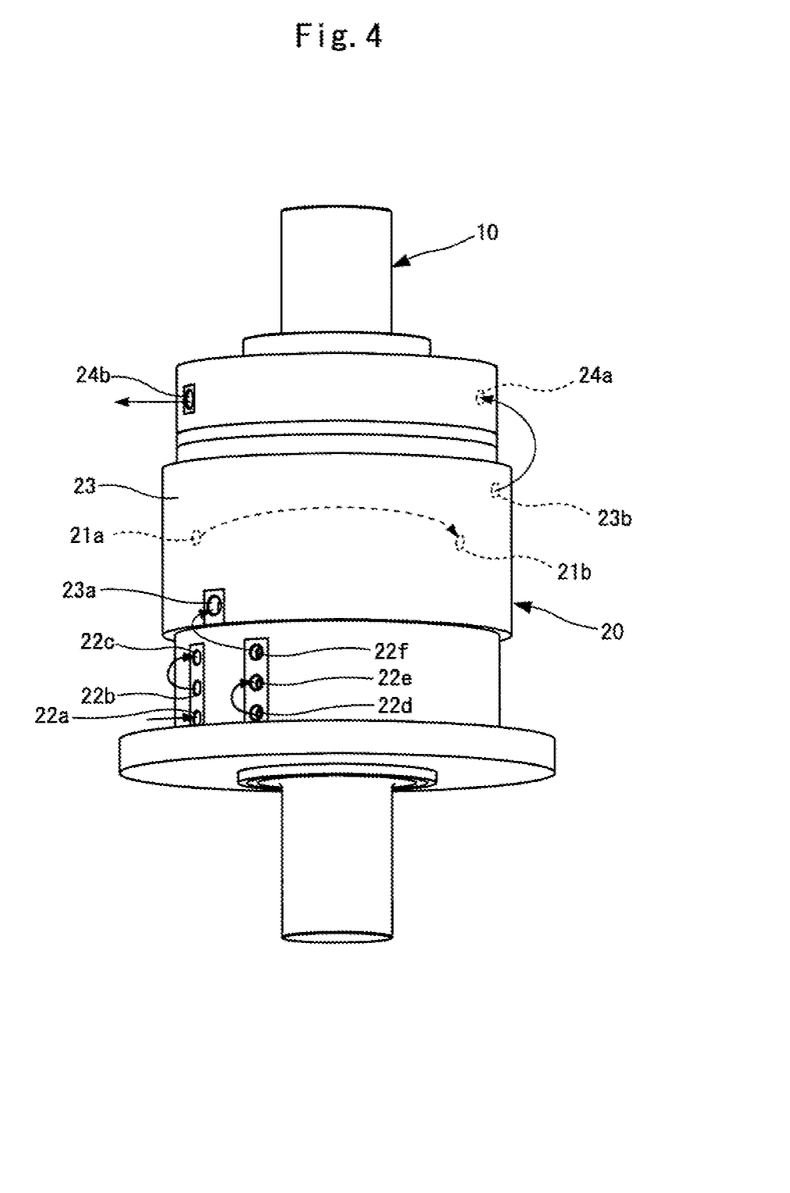
FIG. 4 is an external perspective view of the bearing device according to the embodiment of the present invention.

FIG. 1 is a cross-sectional view showing an internal structure of a bearing device according to an embodiment of the present invention when the bearing device is viewed from a front side thereof, FIG. 2 is a partially cutaway perspective view showing an internal structure of the bearing device, FIG. 3 is a partially cutaway exploded perspective view showing an internal structure of the bearing device, and FIG. 4 is an external perspective view of the bearing device.

The bearing device according to the present embodiment is provided on the outer periphery of a rotating shaft 10, and has functions of supporting the rotating shaft 10 so that the rotating shaft 10 is freely rotatable, and suppressing a temperature rise of the rotating shaft 10 caused by rotation.

As shown in FIG. 4, the bearing device includes a tubular device main body 20, and the device main body 20 is placed on the outer periphery of the rotating shaft 10. As shown in FIGS. 1 to 3, the inside of the device main body 20 constitutes respective functional sections of a bearing portion 30, a magnetic fluid seal portion 50, and a heat exhausting portion 60.

Figure 5A:
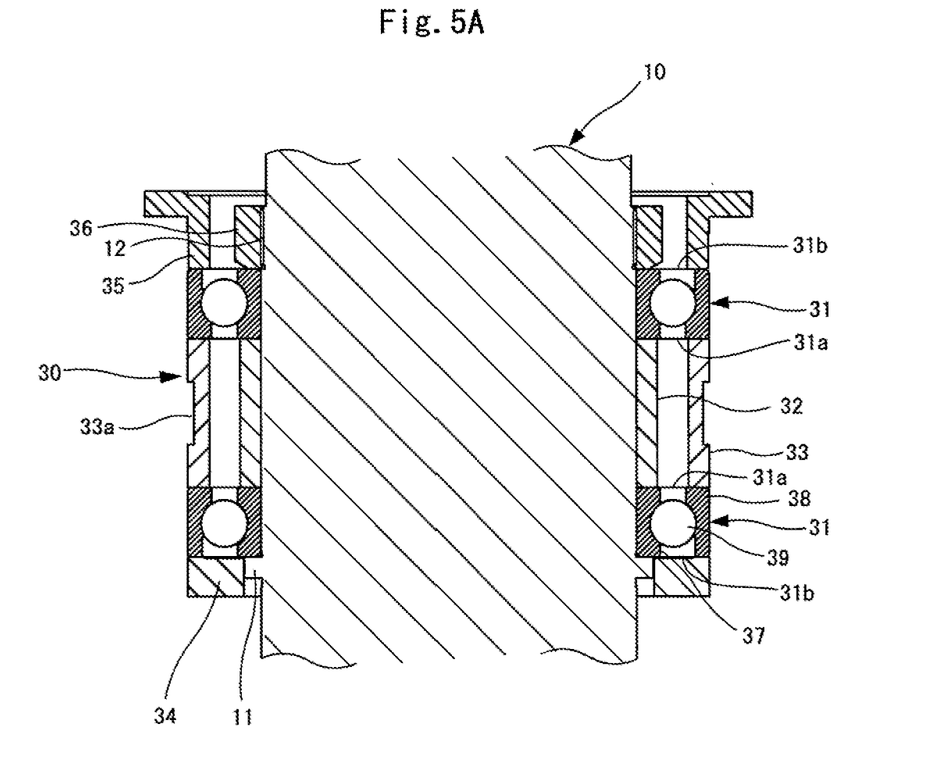
FIG. 5A is a cross-sectional view showing a configuration of a bearing portion when the bearing portion is viewed from a front side thereof.

FIG. 5A is a front-side cross-sectional view showing a configuration of the bearing portion.

The bearing portion 30 is a functional section for supporting the rotating shaft 10 by the bearing 31 so that the rotating shaft 10 is freely rotatable.

As shown in FIG. 5A, a plurality of (two in FIG. 5A) bearings 31, an inner spacer 32 and an outer spacer 33 which are arranged between the respective adjacent bearings 31, an outer ring abutting member 34, an outer ring retaining member 35, and an inner ring retaining member 36 are incorporated in the bearing portion 30.

A specific assembling procedure will be described. The outer ring abutting member 34, one of the bearings 31 (the bearing 31 on the lower side in FIG. 5A), the inner spacer 32 and the outer spacer 33, and the other bearing 31 (the bearing 31 on the upper side in FIG. 5A) are incorporated in this order into the bearing portion 30 formed inside the device main body 20.

Here, a collar-shaped inner ring abutting portion 11 protruding in the radial direction is formed on the outer peripheral surface of the rotating shaft 10, and the inner ring of the one bearing 31 incorporated in the bearing portion 30 abuts on the inner ring abutting portion 11. Further, the outer ring of the one bearing 31 abuts on the outer ring abutting member 34.

A mount portion (inner ring retaining mount portion 12) for the inner ring retaining member 36 is provided on the outer peripheral surface of the rotating shaft 10, and the inner ring retaining member 36 is mounted on the inner ring retaining mount portion 12. Subsequently, the outer ring retaining member 35 is mounted at the entrance of an incorporating portion of the bearing 31 in the device main body 20.

The inner ring retaining member 36 is configured to have a nut structure having a female screw formed on the inner peripheral surface thereof, and is mounted on the inner ring retaining mount portion 12 by screwing the female screw into the inner ring retaining mount portion 12 configured by a male screw. Further, the outer ring retaining member 35 is mounted to the device main body 20 with a plurality of screws.

The respective components are incorporated in the device main body 20 as described above to configure the bearing portion 30.

The bearing 31 is configured so that an inner ring 37 formed of an annular metal member and an outer ring 38 which is likewise formed of an annular metal member are coaxially arranged and rolling elements 39 are incorporated between the inner ring 37 and the outer ring 38.

The inner ring 37 is fixed to the rotating shaft 10, and the outer ring 38 is fixed to the device main body 20. The inner ring 37 rotates integrally with the rotating shaft 10, and during the rotation of the inner ring 37, the rolling elements 39 roll between the outer ring 38 and the inner ring 37.

Here, as the bearing 31 may be used various kinds of publicly-known bearings such as a ball bearing in which the rolling elements 39 consist of balls of metal, ceramic, or the like (for example, a deep groove ball bearing), or a roller bearing in which the rolling elements 39 consist of metal rollers (for example, a tapered roller bearing). In the present embodiment, an angular contact ball bearing that supports a radial load acting in a radial direction and an axial load acting in an axial direction is used as the bearing 31.

The inner spacer 32 is arranged between the bearings 31 so as to be in contact with the respective inner rings 37, and functions as a spacer for adjusting the arrangement interval between the inner rings 37 of the bearings 31. Further, the outer spacer 33 is arranged between the bearings 31 so as to be in contact with the respective outer rings 38, and functions as a spacer for adjusting the arrangement interval between the outer rings 38 of the bearings 31.

The fixed position in the axial direction of the inner ring 37 of each bearing 31 is defined by the inner ring abutting portion 11, the inner spacer 32, and the inner ring retaining member 36. Further, the fixed position in the axial direction of the outer ring 38 of each bearing 31 is defined by the outer ring abutting member 34, the outer spacer 33, and the outer ring retaining member 35.

The inner ring 37 of each bearing 31, the inner ring abutting portion 11, the inner spacer 32, and the inner ring retaining member 36 rotate integrally with the rotating shaft 10 relatively to the outer ring 38 of each bearing 31, the outer ring abutting member 34, the outer spacer 33, and the outer ring retaining member 35 which are fixed to the device main body 20.

When the bearings 31 are incorporated into the bearing portion 30 of the device main body 20, the preload inside each of the bearings 31 (that is, the pressure which the rolling elements 39 suffer from the inner ring 37 and the outer ring 38) is adjusted.

In order to perform this preload adjustment, the inner ring 37 and the outer ring 38 of each bearing 31 are configured to be assembled with each other so that they are relatively displaceable from each other in the axial direction and the preload inside each bearing 31 (which may hereinafter be abbreviated as "the preload of the bearing 31") can be increased or decreased by adjusting the relative position between the inner ring 37 and the outer ring 38.

Figure 5B:
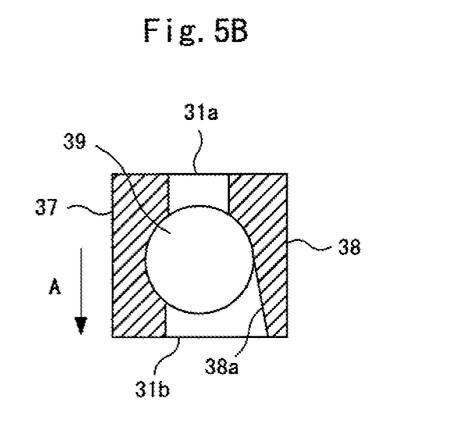
FIGS. 5B and 5C are cross-sectional views of a bearing to explain an example of a preload adjusting mechanism.
Figure 5C:
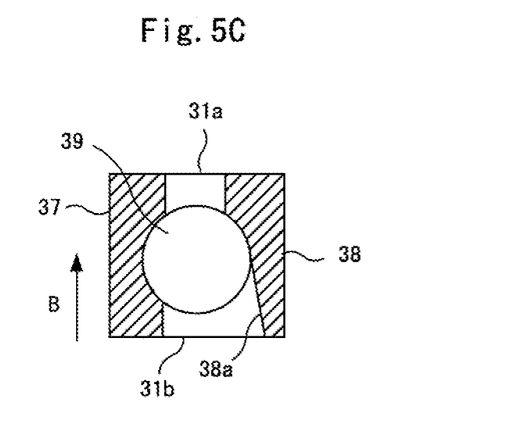

For example, in the bearings 31 shown in FIG. 5A, a slope 38a is formed on the inner peripheral surface of the outer ring 38 as shown in an enlarged manner in FIGS. 5B and 5C. Note that FIGS. 5B and 5C are enlarged views of the cross-section of the bearing 31 arranged at the lower right of FIG. 5A. As shown in FIG. 5B, when the inner ring 37 is relatively displaced in a direction of an arrow A with respect to the outer ring 38, the inner ring 37 is relatively displaced in a direction in which the gap between the slope 38a formed on the inner peripheral surface of the outer ring 38 and the outer peripheral surface of the inner ring 37 spreads, so that the pressure acting on the rolling element 39 sandwiched between the inner ring 37 and the outer ring 38 decreases.

On the contrary, as shown in FIG. 5C, when the inner ring 37 is relatively displaced in a direction of an arrow B with respect to the outer ring 38, the inner ring 37 is relatively displaced in a direction in which the gap between the slope 38a formed on the inner peripheral surface of the outer ring 38 and the outer peripheral surface of the inner ring 37 narrows, so that the pressure acting on the rolling element 39 sandwiched between the inner ring 37 and the outer ring 38 increases.

Generally, the preload of the bearing 31 is adjusted to be a desired pressure by defining the relative positions of the outer ring 38 and the inner ring 37 based on the dimensional difference between the length of the inner spacer 32 and the length of the outer spacer 33.

However, as the rotating shaft 10 rotates, the temperature of the bearings 31 and the rotating shaft 10 rises, so that the bearings 31 and the rotating shaft 10 may expand in the radial direction and thus the preload of the bearing 31 may increase. This increase in preload may cause the bearings 31 to lock, and hinder the smooth rotation of the rotating shaft 10.

Therefore, the bearing device according to the present embodiment has a function of suppressing the preload change inside the bearing 31 caused by the temperature rise of the bearings 31 and the rotating shaft 10.

The bearing device according to the present embodiment includes an outer spacer cooling structure and a preload adjusting mechanism in order to suppress the preload change inside the bearing 31.

The outer spacer cooling structure has a function of cooling the outer spacer 33 to positively provide a temperature difference between the outer spacer 33 and the inner spacer 32, and also a function of absorbing heat transmitted from the bearings 31 to cool the bearings 31 and the rotating shaft 10.

In other words, as the rotating shaft 10 rotates, heat is generated in the bearings 31 due to friction between the rolling elements 39 and each of the inner ring 37 and the outer ring 38, and the heat is transferred to the inner spacer 32 and the outer spacer 33. Further, the rotating shaft 10 also has heat due to an external factor or the like, and the heat is transferred to the inner spacer 32 and also to the outer spacer 33 via the bearings 31. In this way, the temperatures of the inner spacer 32 and the outer spacer 33 rise.

Under such a situation, if only the outer spacer 33 is cooled, a large temperature difference will occur between the outer spacer 33 and the inner spacer 32. In addition, the bearings 31 and the rotating shaft 10 are cooled by absorbing the heat from the bearings 31 and the rotating shaft 10 through the outer spacer 33.

In the bearing device of the present embodiment, the outer spacer cooling structure is configured as follows.

Figure 6:
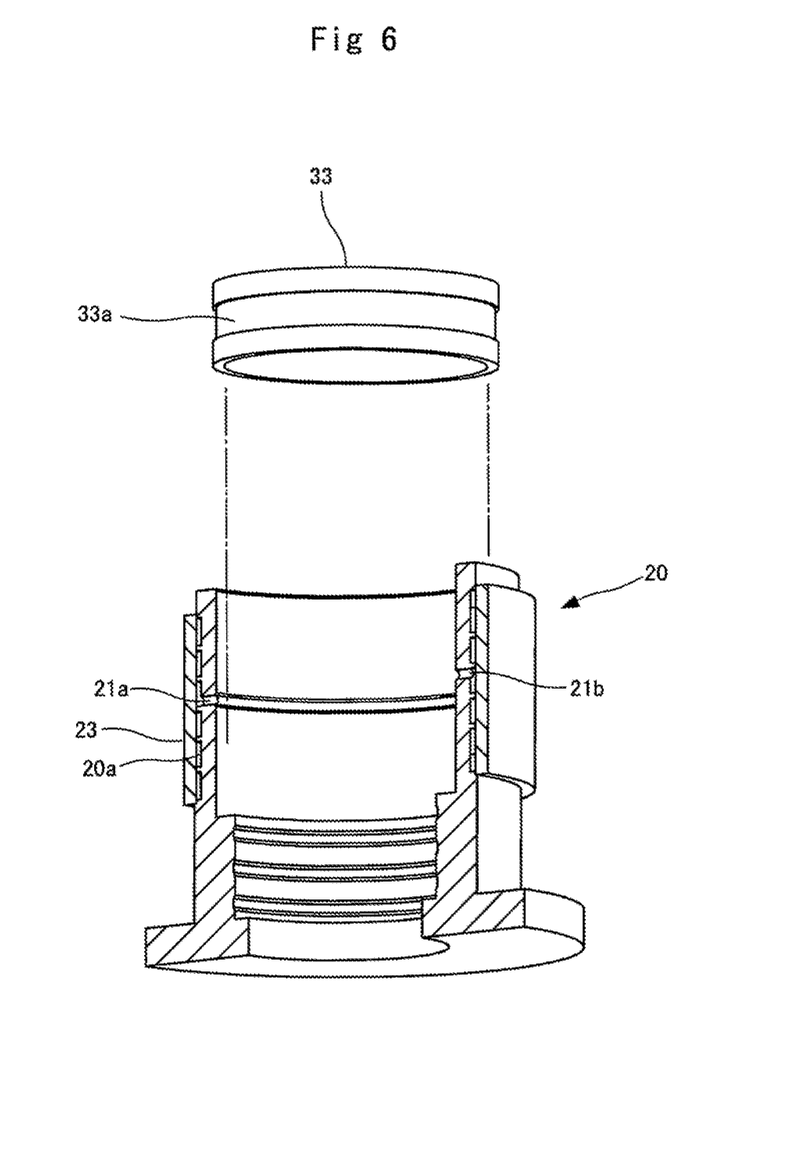
FIG. 6 is a partially cutaway exploded perspective view showing an outer spacer cooling structure.

As shown in FIG. 6, a concave groove 33a extending in the circumferential direction is formed on the outer peripheral surface of the outer spacer 33. In a state where the outer spacer 33 is incorporated in the device main body 20, the outer peripheral surface of the outer spacer 33 is in close contact with the inner peripheral surface of the device main body 20, and a hollow portion is defined by the concave groove 33a (see FIGS. 1, 2 and 5A). The hollow portion defined by the concave groove 33a constitutes a refrigerant flow path for circulating refrigerant.

As shown in FIGS. 1 and 6, through-holes 21a and 21b penetrating from the outer peripheral surface to the inner peripheral surface are formed at two places of the device main body 20, and both of these through-holes 21a and 21b are opened to the hollow portion defined by the concave groove 33a. Refrigerant is supplied from one of the through-holes 21a into the hollow portion defined by the concave groove 33a, and the refrigerant flows in the hollow portion defined by the concave groove 33a and is discharged from the other through-hole 21b.

The refrigerant flowing in the hollow portion defined by the concave groove 33a absorbs heat from the outer spacer 33, so that the outer spacer 33 is cooled and the temperature rise is suppressed.

Further, in the bearing device of the present embodiment, the preload adjusting mechanism is configured as follows by using the outer spacer 33, the inner spacer 32, and the inner rings 37, the rolling elements 39 and the outer rings 38 of the bearings 31 shown in FIG. 5A.

When the outer spacer 33 is cooled by the outer spacer cooling structure and a large temperature difference occurs between the outer spacer 33 and the inner spacer 32, the outer spacer 33 is suppressed from expanding, but the inner spacer 32 thermally expands in the axial direction. Therefore, the inner rings 37 of the bearings 31 that are in contact with the inner spacer 32 are pressed by the inner spacer 32. In other words, the inner spacer 32 constitutes a press mechanism for pressing the inner rings 37 of the bearings 31 in the axial direction.

The inner rings 37 of the bearings 31 are pressed by the inner spacer 32 in this way, whereby a relative displacement occurs between the inner ring 37 and the outer ring 38 of each bearing 31.

Here, the plurality of bearings 31 incorporated in the device main body 20 are arranged so as to form a so-called "back-to-back duplex bearing" in which the back surfaces 31a of the bearings 31 are arranged to face each other (hereinafter referred to as "back-to-back duplex bearing arrangement"), and the inner spacer 32 and the outer spacer 33 are arranged between the bearings 31. When the plurality of bearings 31 are assembled in the back-to-back duplex bearing arrangement as described above, the preload of the bearing 31 becomes high when the inner ring 37 is tightened from the front surface 31b side, whereas the preload of the bearing 31 is released when the inner ring 37 is pressed from the back surface 31a side.

In other words, when a pressing action is applied from the inner spacer 32 arranged at the intermediate portion between the plurality of bearings 31, the inner ring 37 is pressed in the direction of the arrow A as shown in FIG. 5B, so that the inner ring 37 is displaced relatively to the outer ring 38. Since the slope 38a is formed on the inner peripheral surface of the outer ring 38 so that the gap between the slope 38a and the outer peripheral surface of the inner ring 37 spreads in the direction of the arrow A, the pressure acting on the rolling element 39 sandwiched between the inner ring 37 and the outer ring 38 decreases (that is, the preload of the bearing 31 decreases).

On the other hand, as described above, as the temperatures of the bearings 31 and the rotating shaft 10 rise, the bearings 31 and the rotating shaft 10 expand in the radial direction, and the preload of the bearing 31 rises.

The preload adjusting mechanism reduces the preload of the bearing 31 by causing a large temperature difference between the outer spacer 33 and the inner spacer 32 as described above for the increase of the preload of the bearing 31 caused by the temperature rise of the bearings 31 and the rotating shaft 10. The increase of the preload of the bearing 31 caused by the temperature rise of the bearings and the rotating shaft 10 is offset by reducing the preload of the bearing 31 as described above, so that the change of the preload of the bearing 31 is suppressed. The suppression of the change of the preload of the bearing 31 makes it possible to avoid the bearings 31 from locking and realize rotational support which maintains smooth rotation of the rotating shaft 10.

Next, the magnetic fluid seal portion 50 provided inside the device main body 20 will be described.

Returning to FIGS. 1 to 3, the magnetic fluid seal portion 50 is provided side by side with the bearing portion 30 in the device main body 20. The magnetic fluid seal portion 50 is a functional section for filling gaps around the outer periphery of the rotating shaft 10 with magnetic fluid and holding the magnetic fluid filled in the gaps by magnetic flux lines, thereby sealing the gaps.

Figure 7A:
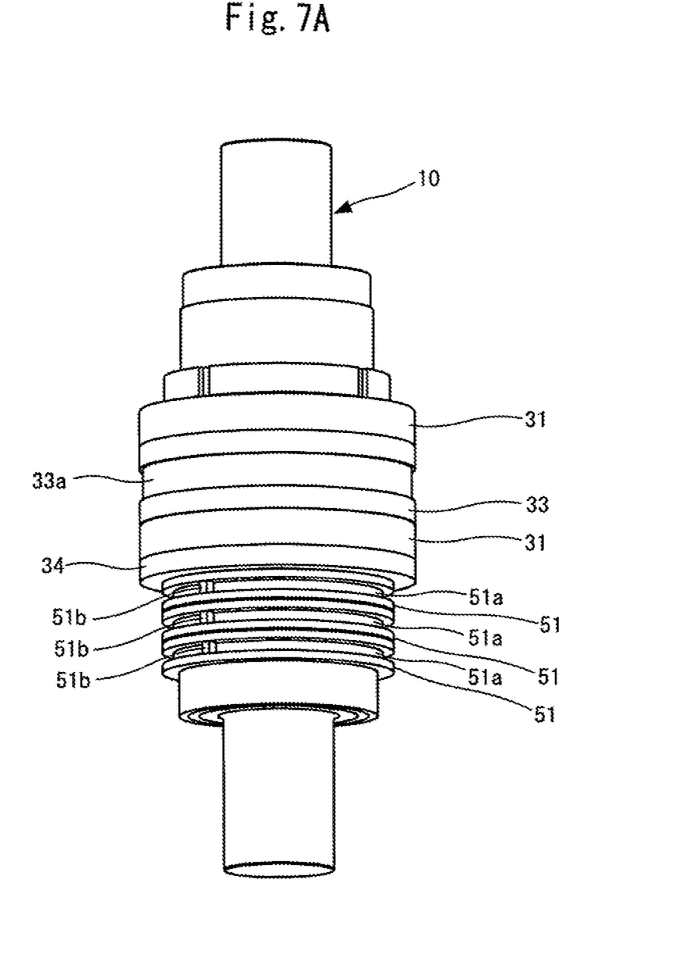
FIG. 7A is a perspective view showing a state in which a plurality of pole pieces is arranged on the outer periphery of a rotating shaft.
Figure 7B:
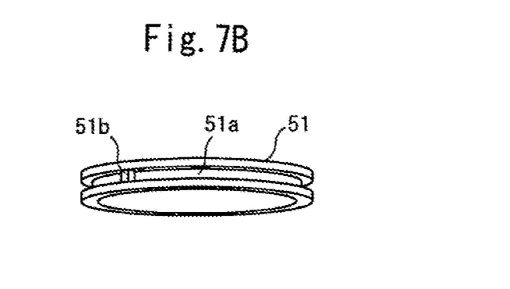
FIG. 7B is a perspective view of a pole piece.

Magnetic pole pieces called pole pieces 51, magnets 52, and magnetic fluid 53 are incorporated in the magnetic fluid seal portion 50. As shown in FIG. 7A, the pole piece 51 is configured in an annular shape and formed of a magnetic material having a high magnetic permeability, and as shown in FIG. 7B, a plurality of (three in FIG. 7A) pole pieces 51 is incorporated in the magnetic fluid seal portion 50 formed inside the device main body 20 in a state where the pole pieces 51 are arranged side by side in the axial direction (see FIGS. 1 to 3). The magnets 52 are incorporated side by side with the pole pieces 51, and the magnetic fluid 53 is filled in the gap between the inner peripheral surface of each pole piece 51 and the outer peripheral surface of the rotating shaft 10. The magnetic fluid 53 is held in the gaps by the magnetic flux lines formed by the magnets 52.

The temperature of the magnetic fluid seal portion 50 also rises due to frictional heat generated between the magnetic fluid 53 and the rotating shaft 10 as the rotating shaft 10 rotates. The frictional heat of the magnetic fluid 53 is transmitted to the rotating shaft 10, and the rotating shaft 10 expands in the radial direction, which causes a risk that the gap between the rotating shaft 10 and the pole piece 51 is narrowed, and the smooth rotation of the rotating shaft 10 is hindered.

Therefore, the bearing device according to the present embodiment is configured to have a cooling structure (magnetic fluid seal portion cooling structure) for cooling the magnetic fluid seal portion 50. The heat generated in the magnetic fluid 53 is transferred to the pole pieces 51, but the magnetic fluid seal portion cooling structure is configured so that the refrigerant absorbs the heat transferred to the pole pieces 51 to cool the magnetic fluid 53.

Specifically, as shown in FIGS. 7A and 7B, a concave groove 51a extending in the circumferential direction is formed on the outer peripheral surface of each pole piece 51, and in a state where the pole piece 51 is incorporated in the device main body 20, the outer peripheral surface of the pole piece 51 is in close contact with the inner peripheral surface of the device main body 20, and a hollow portion is defined by the concave groove 51a (see FIGS. 1 and 2). The hollow portion defined by the concave groove 51a constitutes a refrigerant flow path for circulating the refrigerant.

As shown in FIG. 4, a plurality of (six in FIG. 4) through-holes 22a, 22b, 22c, 22d, 22e, 22f penetrating from the outer peripheral surface to the inner peripheral surface of the device main body 20 is formed in the device main body 20, and these through-holes 22a, 22b, 22c, 22d, 22e, and 22f are all opened to the hollow portion defined by the concave groove 51a (see FIG. 1). Further, as shown in FIGS. 7A and 7B, the concave groove 51a formed on the outer peripheral surface of each pole piece 51 is blocked by a partition wall 51b at a portion of the concave groove 51 in the circumferential direction. With the partition wall 51b as a boundary, the through-holes 22a, 22b, and 22c (half of the through-holes 22a, 22b, 22c, 22d, 22e and 22f) are opened to one side of the concave groove 51, and the through-holes 22d, 22e and 22f (the other half of the through-holes 22a, 22b, 22c, 22d, 22e and 22f) are opened on the other side of the concave groove 51.

Although not shown in the figures, the through-holes 22d and 22e in FIG. 4 are connected to each other through a pipe while the through-holes 22b and 22c in FIG. 4 are connected to each other through a pipe, and the hollow portions defined by the concave grooves 51a formed on the outer peripheral surfaces of the pole pieces 51 constitute a continuous refrigerant flow path via the pipes.

Specifically, when the through-hole 22a shown in FIG. 4 serves as an inlet for refrigerant and the refrigerant is supplied from the through-hole 22a, the refrigerant enters the concave groove 51a of the first pole piece 51 shown in FIG. 7A and flows through the hollow portion defined by this concave groove 51a. Subsequently, the refrigerant enters the adjacent through-hole 22e through the pipe from another through-hole 22d (see FIG. 4) opened to this concave groove 51a, is supplied to the concave groove 51a of the second pole piece 51 shown in FIG. 7A, and flows through the hollow portion defined by this concave groove 51a. Subsequently, the refrigerant enters the adjacent through-hole 22c through the pipe from another through-hole 22b (see FIG. 4) opened to the above concave groove 51a, is supplied to the concave groove 51a of the third pole piece 51 shown in FIG. 7A, and flows through the hollow portion defined by this concave groove 51a. Then, the refrigerant is discharged from the through-hole 22f (see FIG. 4).

In the flow process of the refrigerant flowing through the refrigerant flow path having such a path, the refrigerant absorbs the heat of the pole pieces 51 and cools the magnetic fluid 53.

Next, the bearing cooling structure provided in the device main body 20 will be described.

Figure 8:
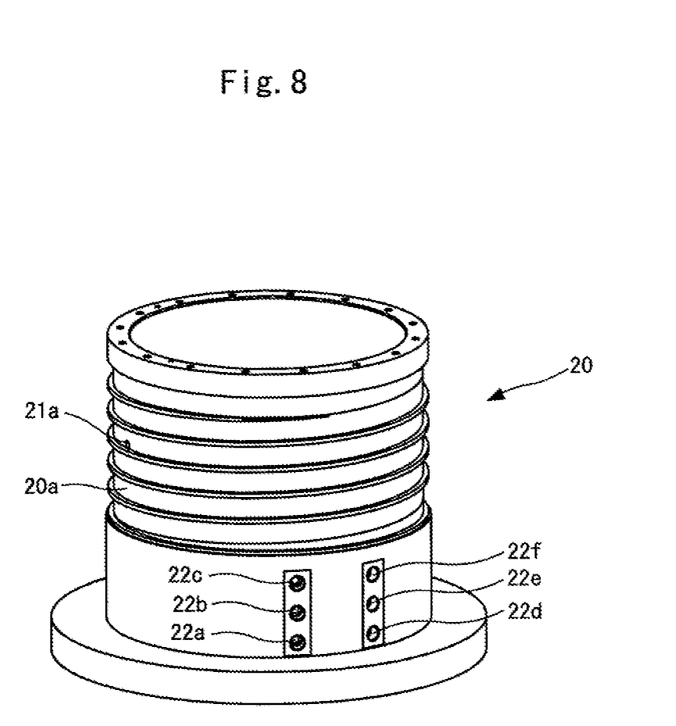
FIG. 8 is a perspective view showing a bearing cooling structure.

Returning to FIGS. 1 to 3, a concave groove 20a is formed on the outer peripheral surface of the device main body 20. As shown in FIG. 8, the concave groove 20a is formed on the outer peripheral surface of the device main body 20 so as to draw one spiral track. As shown in FIGS. 1 to 3, a cylindrical covering member 23 is fitted into the outer peripheral surface of the device main body 20 having the concave groove 20a formed thereon, and the inner peripheral surface of the covering member 23 is in close contact with the outer peripheral surface of the device main body 20, whereby a hollow portion extending spirally is defined by the concave groove 20a. The hollow portion defined by the concave groove 20a constitutes a refrigerant flow path for circulating the refrigerant.

As shown in FIGS. 2 and 3, the covering member 23 has two through-holes 23a and 23b that is formed in the covering member 23 so as to penetrate from the outer peripheral surface to the inner peripheral surface of the covering member 23, and one through-hole 23a is opened near a start end portion of the spiral hollow portion defined by the concave groove 20a, and the other through-hole 23b is opened near a terminal end portion of the spiral hollow portion defined by the concave groove 20a.

Further, the through-hole 23a that opens near the start end portion of the hollow portion communicates with the through-hole 22f of the magnetic fluid seal portion 50 described above through a pipe (not shown) (see FIG. 4). As a result, the refrigerant which flows through the refrigerant flow path of the seal portion cooling structure and is discharged from the through-hole 22f is supplied from the through-hole 23a through the pipe to the hollow portion defined by the concave groove 20a.

Then, the refrigerant supplied from the through-hole 23a flows through the spiral hollow portion defined by the concave groove 20a, and is discharged from the other through-hole 23b (see FIG. 4).

The refrigerant which flows in the spiral hollow portion defined by the concave groove 20a absorbs heat from the device main body 20. As a result, the plurality of bearings 31 incorporated in the device main body 20 is cooled.

Further, the two through-holes 21a and 21b opened to the hollow portion defined by the concave groove 33a of the outer spacer 33 described above with reference to FIGS. 1 and 6 are also opened respectively to the spiral hollow portion defined by the concave groove 20a, and a part of the refrigerant flowing through the spiral hollow portion is supplied from the through-hole 21a into the hollow portion defined by the concave groove 33a of the outer spacer 33, flows through this hollow portion, and then returns from the other through-hole 21b to the spiral hollow portion again.

The through-holes 21a and 21b shown in FIG. 6 are provided at positions where they are arranged to be point-symmetrical with respect to a central axis (positions spaced at an angular interval of 180 degrees). The refrigerant supplied from the through-hole 21a branches and flows clockwise and counterclockwise in the concave groove 33a, is discharged from the other through-hole 21b and then returns into the spiral hollow portion defined by the concave groove 33a.

Note that the through-holes 21a and 21b may be configured to be arranged side by side near to each other in the circumferential direction with the partition wall being sandwiched therebetween so that the refrigerant supplied from the through-hole 21a flows in one direction through the concave groove 33a and then is discharged from the other through-hole 21b. Such a configuration makes it possible to eliminate collision caused by merging of the refrigerant in the through-hole 21b and smoothly discharge the refrigerant.

Next, the heat exhausting portion 60 provided inside the device main body 20 will be described.

Returning to FIGS. 1 to 3, the heat exhausting portion 60 is provided inside the device main body 20 to be arranged side by side with the bearing portion 30 on the opposite side to the magnetic fluid seal portion 50. The heat exhausting portion 60 is a functional section for absorbing heat accumulated in the rotating shaft 10 to directly cool the rotating shaft 10. A structure for cooling the rotating shaft 10 is formed in the heat exhausting portion 60.

Figure 9:
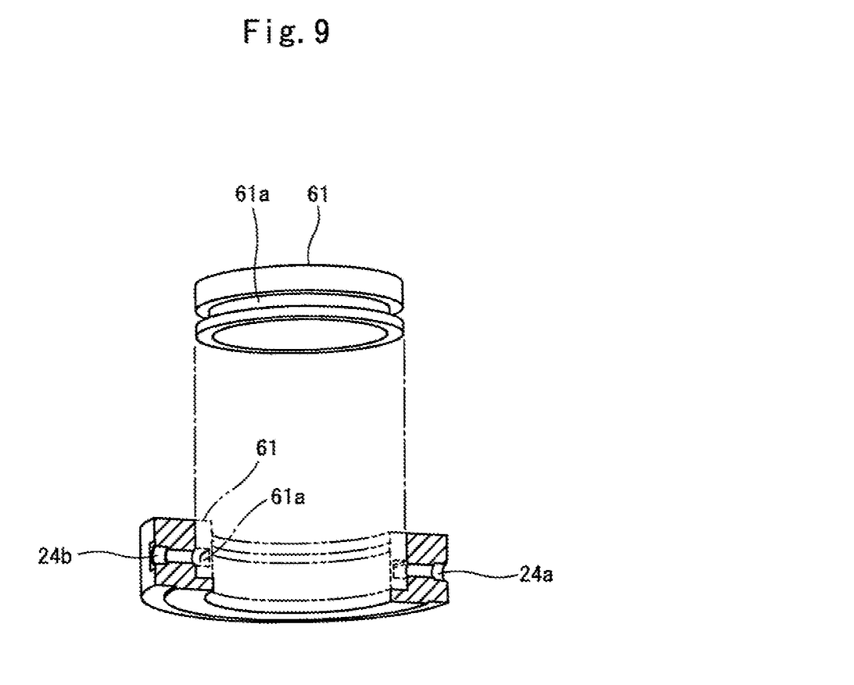
FIG. 9 is a partially cutaway exploded perspective view showing a cooling structure of the rotating shaft in a heat exhausting portion.

Specifically, as shown in FIG. 9, an annular shaft heat absorbing member 61 is incorporated in the heat exhausting portion 60 of the device main body 20. The inner peripheral surface of the shaft heat absorbing member 61 is arranged so as to be in light contact with the outer peripheral surface of the rotating shaft 10. As a result, the heat from the rotating shaft 10 is transferred to the shaft heat absorbing member 61.

A concave groove 61a extending in the circumferential direction is formed on the outer peripheral surface of the shaft heat absorbing member 61. In a state where the shaft heat absorbing member 61 is incorporated inside the device main body 20, the outer peripheral surface of the shaft heat absorbing member 61 is in close contact with the inner peripheral surface of the device main body 20, whereby a hollow portion is defined by the concave groove 61*a* (see FIGS. 1, 2 and 9). The hollow portion defined by the concave groove 61*a* constitutes a refrigerant flow path for circulating the refrigerant.

Through-holes 24*a* and 24*b* are formed at two places of the device main body 20 so as to penetrate from the outer peripheral surface to the inner peripheral surface, and both of these through-holes 24*a* and 24*b* are opened to the hollow portion defined by the concave groove 61*a*. One trough-hole 24*a* communicates with the through-hole 23*b* formed in the covering member 23 of the bearing cooling structure via a pipe (not shown). As a result, the refrigerant discharged from the through-hole 23*b* in the bearing cooling structure is sent to the through-hole 24*a* via the pipe (not shown) (see FIG. 4).

The refrigerant is supplied from the through-hole 24*a* into the hollow portion defined by the concave groove 61*a*, and this refrigerant flows in the hollow portion defined by the concave groove 61*a* and then is discharged from the other through-hole 24*b*.

The refrigerant flowing in the hollow portion defined by the concave groove 61*a* absorbs heat transferred from the rotating shaft 10 to the shaft heat absorbing member 61, whereby the rotating shaft 10 is cooled.

Here, the through-holes 24*a* and 24*b* shown in FIG. 9 are also provided at positions where they are arranged to be point-symmetrical with respect to the central axis (positions spaced at an angular interval of 180 degrees) as in the case of the through-holes 21*a* and 21*b* shown in FIG. 6. The refrigerant supplied from the through-hole 24*a* branches and flows clockwise and counterclockwise in the concave groove 61*a*, is discharged from the other through-hole 24*b*.

Note that the through-holes 24*a* and 24*b* may be configured to be arranged side by side near to each other in the circumferential direction with the partition wall being sandwiched therebetween so that the refrigerant supplied from the through-hole 24*a* flows in one direction through the concave groove 61*a* and then is discharged from the other through-hole 24*b*. Such a configuration makes it possible to eliminate collision caused by merging of the refrigerant in the through-hole 24*b* and smoothly discharge the refrigerant.

As shown in FIG. 9, the other through-hole 24*b* formed in the device main body 20 is connected via a pipe (not shown) to a refrigerant cooling circulation device (not shown) which is provided to be arranged side by side with the bearing device. The refrigerant discharged from the other through-hole 24*b* is sent to the refrigerant cooling circulation device (not shown), cooled by this device, and then circulated and supplied to the through-hole 22*a* of the seal portion cooling structure again.

Here, the circulation path of the refrigerant will be described again with reference to FIG. 4. The refrigerant supplied from the refrigerant cooling circulation device (not shown) to the through-hole 22*a* of the seal portion cooling structure flows through the hollow portion defined by the concave groove 51*a* which is formed in the seal portion cooling structure shown in FIGS. 1 and 2, and absorbs the heat transferred from the rotating shaft 10 to the pole pieces 51.

Next, the refrigerant is supplied from the through-hole 22*f* of the seal portion cooling structure to the through-hole 23*a* of the bearing cooling structure, flows through the spiral hollow portion defined by the concave groove 20*a* formed in the bearing cooling structure, and absorbs the heat transferred from the rotating shaft 10 to the device main body 20.

Further, a part of the refrigerant is supplied from the through-hole 21*a* formed in the device main body 20 to the hollow portion defined by the concave groove 33*a* formed in the outer spacer cooling structure, and flows through the hollow portion to absorb heat transferred from the bearings 31 and the rotating shaft 10 to the outer spacer 33. Then, the refrigerant returns from the other through-hole 21*b* formed in the device main body 20 to the spiral hollow portion defined by the concave groove 20*a* formed in the bearing cooling structure.

Subsequently, the refrigerant is supplied from the through-hole 23*b* of the bearing cooling structure to the through-hole 24*a* of the heat exhausting portion 60, and flows through the hollow portion formed by the concave groove 61*a* formed in the heat exhausting portion 60 to adsorb the heat transferred from the rotating shaft 10 to the shaft heat absorbing member 61. Then, the refrigerant is returned from the through-hole 24*b* of the heat exhausting portion 60 to the refrigerant cooling circulation device (not shown), cooled, and then supplied to the through-hole 22*a* of the seal portion cooling structure again.

As described above, since the bearing device according to the present embodiment includes the respective cooling structures of the bearing cooling structure, the magnetic fluid seal portion cooling structure, the cooling structure of the rotating shaft 10 in the heat exhausting portion 60, and the outer spacer cooling structure, the heat from the bearings 31 and the rotating shaft 10 is absorbed by the refrigerant circulating in each cooling structure, so that the bearings 31 and the rotating shaft 10 can be efficiently cooled.

Further, since the refrigerant flow paths provided in the respective cooling structures are caused to communicate with one another to make the common refrigerant flow through these refrigerant flow paths, the circulation control of the refrigerant can be simplified and more efficient cooling can be realized.

Note that the present invention is not limited to the above-described embodiment, and it goes without saying that various modifications and applications can be carried out as needed.

For example, the preload adjusting mechanism for reducing the preload inside the bearing is not limited to the configuration using the slope 38*a* as shown in FIGS. 5B and 5C, but various configurations may be applied as long as they reduce the preload inside the bearing according to the relative displacement between the outer ring and the inner ring of the bearing.

In the above-described embodiment, in order to form the refrigerant flow path of the bearing cooling structure, the concave groove 20*a* is formed on the outer peripheral surface of the device main body 20. However, a concave groove may be formed on the covering member 23 to constitute a refrigerant flow path, or concave grooves may be formed on both the outer peripheral surface of the device main body 20 and the covering member 23 to constitute a refrigerant flow path.

Similarly, instead of the concave groove 33*a* defining the refrigerant flow path of the outer spacer cooling structure, a concave groove may be formed on the inner peripheral surface of the device main body 20 in contact with the outer spacer 33 to constitute a refrigerant flow path, or concave grooves may be formed on both the outer spacer 33 and the inner peripheral surface of the device main body 20 to constitute a refrigerant flow path.

Similarly, instead of the concave groove 51*a* defining the refrigerant flow path of the magnetic fluid seal portion cooling structure, a concave groove may be formed on the inner peripheral surface of the device main body 20 in contact with the pole piece 51 to constitute a refrigerant flow path, or concave grooves may be formed on both the pole piece 51 and the inner peripheral surface of the device main body 20 to constitute a refrigerant flow path.

Similarly, instead of the concave groove 61*a* defining the refrigerant flow path of the heat exhausting portion 60, a concave groove may be formed on the inner peripheral surface of the device main body 20 in contact with the shaft heat absorbing member 61 to constitute a refrigerant flow path, or concave grooves may be formed on both the shaft heat absorbing member 61 and the inner peripheral surface of the device main body 20 to constitute a refrigerant flow path.

Further, in addition to the structure for cooling the outer spacer 33, the above-described embodiment has the structure for cooling the bearings 31, the structure for cooling the magnetic fluid seal portion 50, and the cooling structure for the rotating shaft 10 in the heat exhausting portion 60, but some of these structures may be omitted.

Further, in the above-described embodiment, the refrigerant is supplied from the magnetic fluid seal portion 50 to the outer spacer 33 via the periphery of the device main body 20, and further caused to flow from the periphery of the device main body 20 to the heat exhausting portion 60. However, the flow path of the refrigerant is not limited to this path, and may be appropriately changed as necessary.

The invention claimed is:

1. A bearing device for supporting a rotating shaft by a plurality of bearings so that the rotating shaft is freely rotatable, comprising:
   an inner spacer arranged between respective adjacent bearings of the plurality of bearings so as to be in contact with an inner ring of each of the respective adjacent bearings;
   an outer spacer arranged between respective adjacent bearings of the plurality of bearings so as to be in contact with an outer ring of each of the respective adjacent bearings; and
   a device main body which accommodates the plurality of bearings, the inner spacer and the outer spacer therein, wherein a first refrigerant flow path for cooling the plurality of bearings is formed in the device main body, a second refrigerant flow path for cooling the outer spacer are formed in the device main body, and the first and the second refrigerant flow paths are configured to communicate with each other and circulate refrigerant therethrough,
   wherein the first refrigerant flow path has a spiral hollow portion defined by a first concave groove formed on the device main body, the second refrigerant flow path has a hollow portion defined by a second concave groove formed in the outer spacer, and a part of refrigerant flowing through the spiral hollow portion defined by the first concave groove is supplied into the hollow portion defined by the second concave groove.

2. The bearing device according to claim 1, wherein the inner spacer is formed in a cylindrical shape along the inner ring of the bearing, the outer spacer is formed in a cylindrical shape along the outer ring of the bearing, and the inner spacer is configured so as to press the inner ring of the bearing in an axial direction according to a temperature difference generated between the inner spacer and the outer spacer, thereby displacing the inner ring of the bearing in the axial direction relatively to the outer ring of the bearing.

3. The bearing device according to claim 2, wherein the plurality of bearings is assembled in a back-to-back duplex bearing arrangement in which back surfaces thereof are arranged to face each other.

4. The bearing device according to claim 1, wherein the device main body further comprises a magnetic fluid seal portion, wherein a third refrigerant flow path for cooling the magnetic fluid seal portion is formed in the device main body, and the first, the second, and the third refrigerant flow paths are configured to communicate with each other and circulate refrigerant therethrough.

5. The bearing device according to claim 4, wherein the second refrigerant flow path for cooling the outer spacer is formed on a downstream side of the third refrigerant flow path for cooling the magnetic fluid seal portion.

6. The bearing device according to claim 1, wherein the device main body further comprises a heat exhausting portion for cooling the rotating shaft, wherein a fourth refrigerant flow path for cooling the heat exhausting portion is formed in the device main body, the first and the second refrigerant flow paths are formed in the device main body, and the fourth, the first, and the second refrigerant flow paths are configured to communicate with each other and circulate refrigerant.

7. The bearing device according to claim 1, wherein the device main body further comprises a magnetic fluid seal portion and a heat exhausting portion for cooling the rotating shaft, wherein the first refrigerant flow path for cooling the plurality of bearings, a third refrigerant flow path for cooling the magnetic fluid seal portion, a fourth refrigerant flow path for cooling the heat exhausting portion, and the first and the second refrigerant flow paths are formed in the device main body, and the first, the second, the third, and the fourth refrigerant flow paths are configured to communicate with one another and circulate refrigerant.

* * * * *